(12) United States Patent
Adiththan et al.

(10) Patent No.: US 11,532,188 B2
(45) Date of Patent: Dec. 20, 2022

(54) ARCHITECTURE AND METHODOLOGY FOR STATE ESTIMATION FAILURE DETECTION USING CROWDSOURCING AND DEEP LEARNING

(71) Applicant: GM GLOBAL TECHNOLOGY OPERATIONS LLC, Detroit, MI (US)

(72) Inventors: Arun Adiththan, Sterling Heights, MI (US); Praveen Palanisamy, Sterling Heights, MI (US); SeyedAlireza Kasaiezadeh Mahabadi, Shelby Township, MI (US); Ramesh S, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 399 days.

(21) Appl. No.: 16/548,166

(22) Filed: Aug. 22, 2019

(65) Prior Publication Data

US 2021/0056779 A1    Feb. 25, 2021

(51) Int. Cl.
*G07C 5/08* (2006.01)
*G06N 3/08* (2006.01)
*G07C 5/00* (2006.01)

(52) U.S. Cl.
CPC .............. *G07C 5/085* (2013.01); *G06N 3/08* (2013.01); *G07C 5/008* (2013.01)

(58) Field of Classification Search
CPC ....... G07C 5/085; G07C 5/008; G07C 5/0816; G06N 3/08; G06N 3/0427; G06N 3/02; H04W 8/00; H04W 4/44; H04W 4/46; H04W 4/48
See application file for complete search history.

(56) References Cited

U.S. PATENT DOCUMENTS

| | | | |
|---|---|---|---|
| 2017/0249698 A1* | 8/2017 | Chan | G06Q 50/01 |
| 2019/0316913 A1* | 10/2019 | Golov | G06N 3/02 |
| 2020/0205006 A1* | 6/2020 | Denis | H04W 12/122 |
| 2020/0387833 A1* | 12/2020 | Kursun | G06F 21/554 |

* cited by examiner

*Primary Examiner* — James J Lee
*Assistant Examiner* — Steven Vu Nguyen
(74) *Attorney, Agent, or Firm* — Cantor Colburn LLP

(57) ABSTRACT

A vehicle and a system and method for operating a vehicle. The system includes a state estimator and a processor. A detected value of a parameter of the vehicle is determined using sensor data obtained by in-vehicle detectors. The processor determines a check value of the parameter based on crowdsourced data, validates the detected value of the parameter based on the check value of the parameter, and operates the vehicle based on the validation.

18 Claims, 10 Drawing Sheets

ARCHITECTURE AND METHODOLOGY FOR STATE ESTIMATION FAILURE DETECTION USING CROWDSOURCING AND DEEP LEARNING

INTRODUCTION

The subject disclosure relates to estimating a failure state of a sensor of a vehicle and, in particular, to a system and method for determining the failure state of the sensor using crowdsourced data in a neural network.

Autonomous vehicles are able to navigate a terrain based on external and internal state parameters. The external parameters are based on data regarding the surrounding environment and other vehicles or agents within the environment. Such external parameters can include radar measurements, Lidar measurements, etc. that can determine a range, velocity, location, etc. of agents, speed limits, etc. Internal state parameters include parameters regarding the state of the vehicle, such as its longitudinal and lateral velocities, etc. Successful navigation of the terrain is built upon the accuracy of both the external parameters and internal state parameters. In-vehicle sensors are generally used to measure data from which the internal state parameters are derived. When the internal state parameters fail to accurately represent actual vehicular state, control of the vehicle is diminished. Accordingly, it is desirable to provide a system and method for identifying a failure of a state estimation system to detect internal state parameters of the vehicle.

SUMMARY

In one exemplary embodiment, a method for operating a vehicle is disclosed. A detected value of a parameter of the vehicle is determined using sensor data obtained by in-vehicle detectors. A check value of the parameter is determined based on crowdsourced data. The detected value of the parameter is validated based on the check value of the parameter. The vehicle is operated based on the validation.

In addition to one or more of the features described herein, the method further includes training a neural network using the sensor data and the crowdsourced data and determining the check value using the trained neural network. The method further includes training the neural network at an offsite location using the sensor data and the crowdsourced data and transmitting the trained neutral network from the offsite location to the vehicle. The check value is determined using the trained neural network at the vehicle. The method further includes performing a verification of the crowdsourced data and assigning a reputation score to a participating agent providing the crowdsourced data. A training set of data can be selected based on a utility of the data to a selected data category. A training set of data can be selected based on a metric for the crowdsourced data.

In another exemplary embodiment, a system for operating a vehicle is disclosed. The system includes a state estimator and a processor. The state estimator estimates a value of a state parameter of vehicle from in-vehicle sensor data. The processor is configured to determine a check value of the parameter based on crowdsourced data, validate the detected value of the parameter based on the check value of the parameter, and operate the vehicle based on the validation.

In addition to one or more of the features described herein, the processor is further configured to train a neural network using the sensor data and the crowdsourced data and determine the check value using the trained neural network. The can be at an offsite location from the vehicle and further configured to train the neural network using the sensor data and the crowdsourced data and transmit the trained neutral network from the offsite location to the vehicle. The processor is further configured to determine the check value using the trained neural network at the vehicle. The processor is further configured to perform a verification of the crowdsourced data and assign a reputation score to a participating agent providing the crowdsourced data. The processor is further configured to select a training set of data based on a utility of the data to a selected data category. The processor is further configured to select a training set of data based on a metric for the crowdsourced data.

In yet another exemplary embodiment, a vehicle is disclosed. The vehicle includes a state estimator and a processor. The state estimator estimates a value of a state parameter of vehicle from in-vehicle sensor data. The processor is configured to determine a check value of the parameter based on crowdsourced data, validate the detected value of the parameter based the check value of the parameter, and operate the vehicle based on the validation.

In addition to one or more of the features described herein, the processor is further configured to receive a trained neural network that is trained using the sensor data and the crowdsourced data and using the trained neural network to determine the check value. The neural network can be trained at an offsite location and the vehicle received the trained neutral network from the offsite location. The processor is further configured to determine the check value using the trained neural network at the vehicle. The processor is further configured to perform a verification of the crowdsourced data and assign a reputation score to a participating agent providing the crowdsourced data. The processor is further configured to select a training set of data based on one of a utility of the data to a selected data category and a metric for the crowdsourced data.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
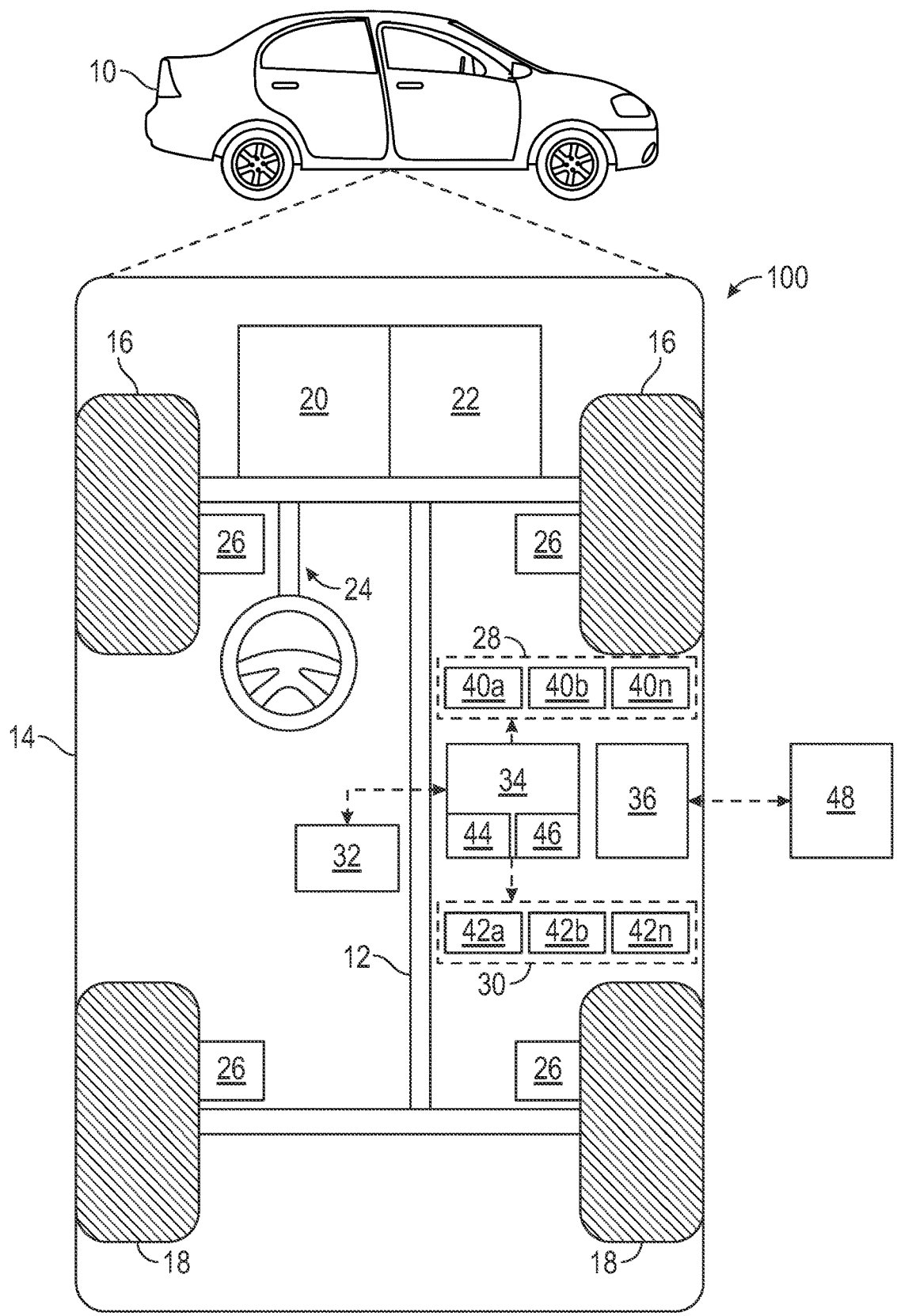
FIG. 1 shows a vehicle including an associated trajectory planning system in accordance with various embodiments.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 10 including an associated trajectory planning system shown generally at 100 in accordance with various embodiments. In general, the trajectory planning system 100 determines a trajectory plan for automated driving of the vehicle 10. The vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16 and 18 are each rotationally coupled to the chassis 12 near respective corners of the body 14.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16 and 18. The brake system 26 may, in various embodiments, include friction brakes, brake by wire, a regenerative braking system such as an electric machine, and/or other appropriate braking systems. The steering system 24 influences a position of the vehicle wheels 16 and 18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors for observing and measuring parameters of the exterior environment. The sensing devices 40a-40n may further include brake sensors, steering angle sensors, wheel speed sensors, etc. for observing and measuring in-vehicle parameters of the vehicle. The cameras can include two or more digital cameras spaced at a selected distance from each other, in which the two or more digital cameras are used to obtain stereoscopic images of the surrounding environment in order to obtain a three-dimensional image. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the trajectory planning system 100 and, when executed by the processor 44, generates a trajectory output. The processor 44 further includes programs for operating the vehicle in order to determine a validity of various in-vehicle measurements made by the sensing devices 40a-40n using crowdsourced data, as discussed herein.

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

Figure 2:
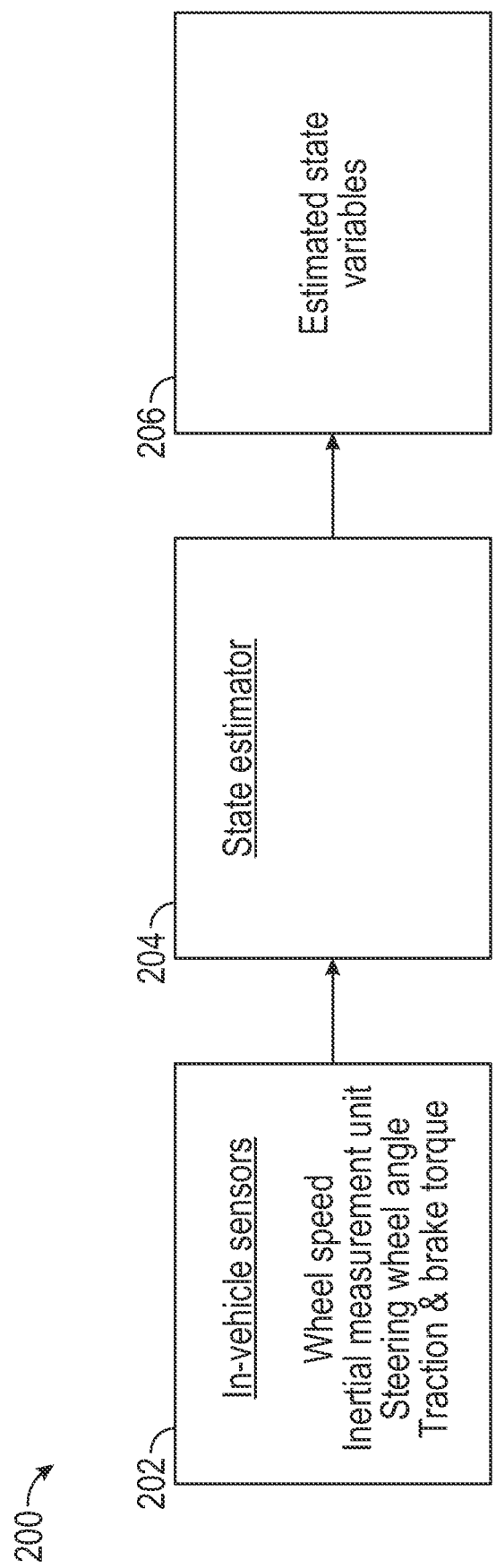
FIG. 2 shows a schematic diagram of an illustrative method for determining a vehicle state using data from one or more in-vehicle sensors.

FIG. 2 shows a schematic diagram 200 of an illustrative method for determining a vehicle state using data from one or more in-vehicle sensors 202. The in-vehicle sensors 202 can include the various sensors 40a-40n of FIG. 1 as well as other sensors. In various embodiments, the in-vehicle sensors 202 can include wheel speed sensors, an inertial measurement unit, a steering wheel angle sensor, a traction & brake torque sensor, etc. The in-vehicle sensors 202 provide sensor data to a state estimator 204. The sensor data can include a total torque and wheel speed, longitudinal acceleration, lateral acceleration, yaw rate, steering angle and steering rate, etc. The state estimator 204 determines various state variables 206 from the sensor data, including for example vehicle lateral velocity, vehicle longitudinal velocity, tire lateral velocity, tire longitudinal velocity, etc.

Figure 3:
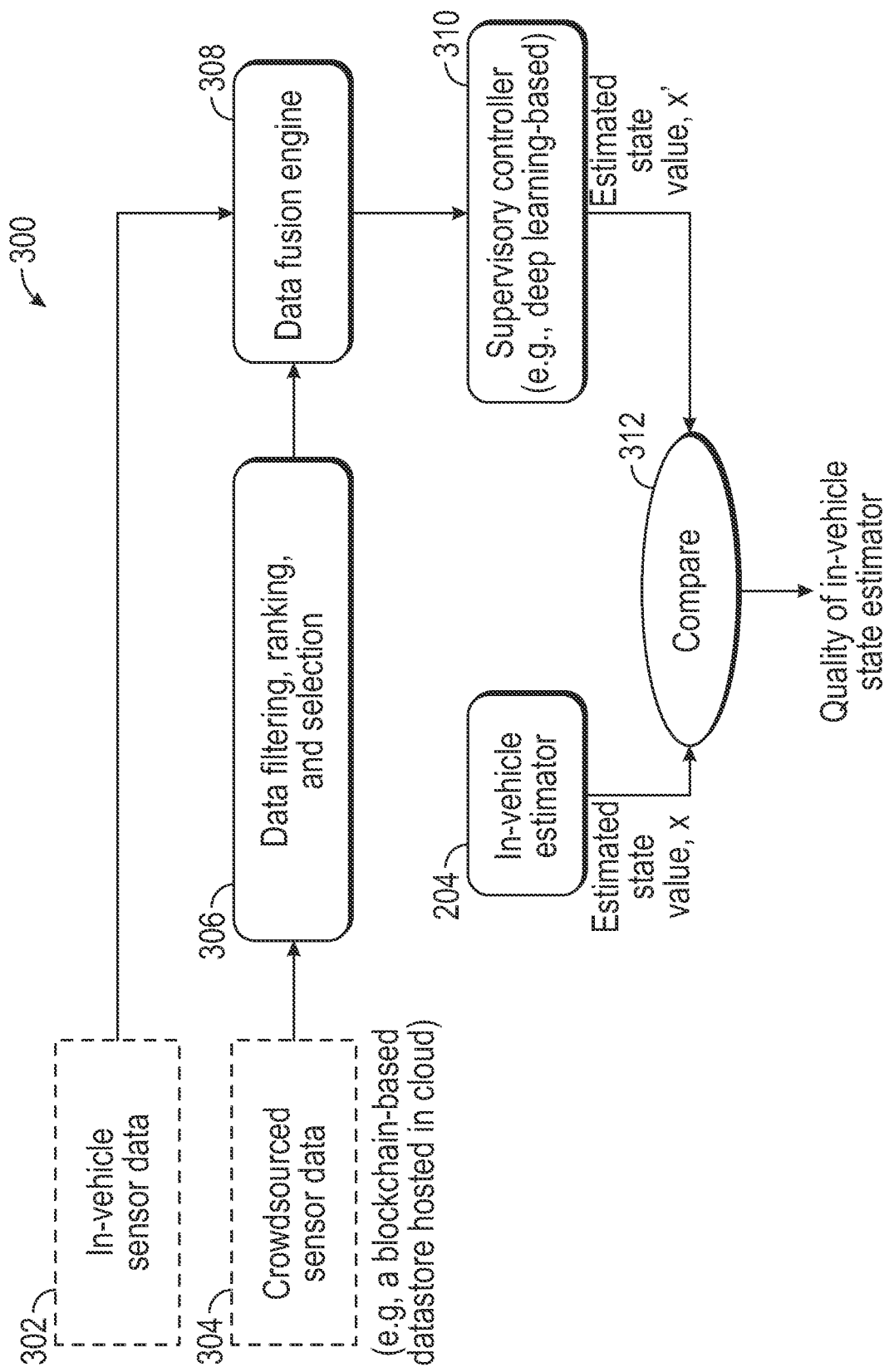
FIG. 3 shows a schematic diagram of a method for determining a quality of the in-vehicle state estimator of FIG. 2.

FIG. 3 shows a schematic diagram 300 of a method for determining a quality of the in-vehicle state estimator 204 of FIG. 2. In-vehicle sensor data 302 is provided to a data fusion engine 308. Crowdsourced data 304 is provided to a selection engine 306 that filters, ranks and selects the crowdsourced data based on a reliability and quality of the crowdsourced data. Crowdsourced data includes data received from surrounding vehicles that have performed measurements regarding the host vehicle. For example, the surrounding vehicles can obtain velocity measurements of the host vehicle as part of their own traffic navigation systems. The selected crowdsourced data is sent to the data fusion engine 308. The data fusion engine 308 is used to train a supervisory controller 310 such as a Deep Neural Network based on a fusion of the in-vehicle sensor data 302 and the selected crowdsourced data 304. The supervisory controller 310 generates an estimate of values of the state variables for the autonomous vehicle 10. The in-vehicle state estimator 204 generates its own state variable values, and a comparison engine 312 compares the estimate of values from the in-vehicle state estimator 204 to the estimate of values form the supervisory controller 310 in order to determine a quality of the in-vehicle state estimator 204.

Figure 4:
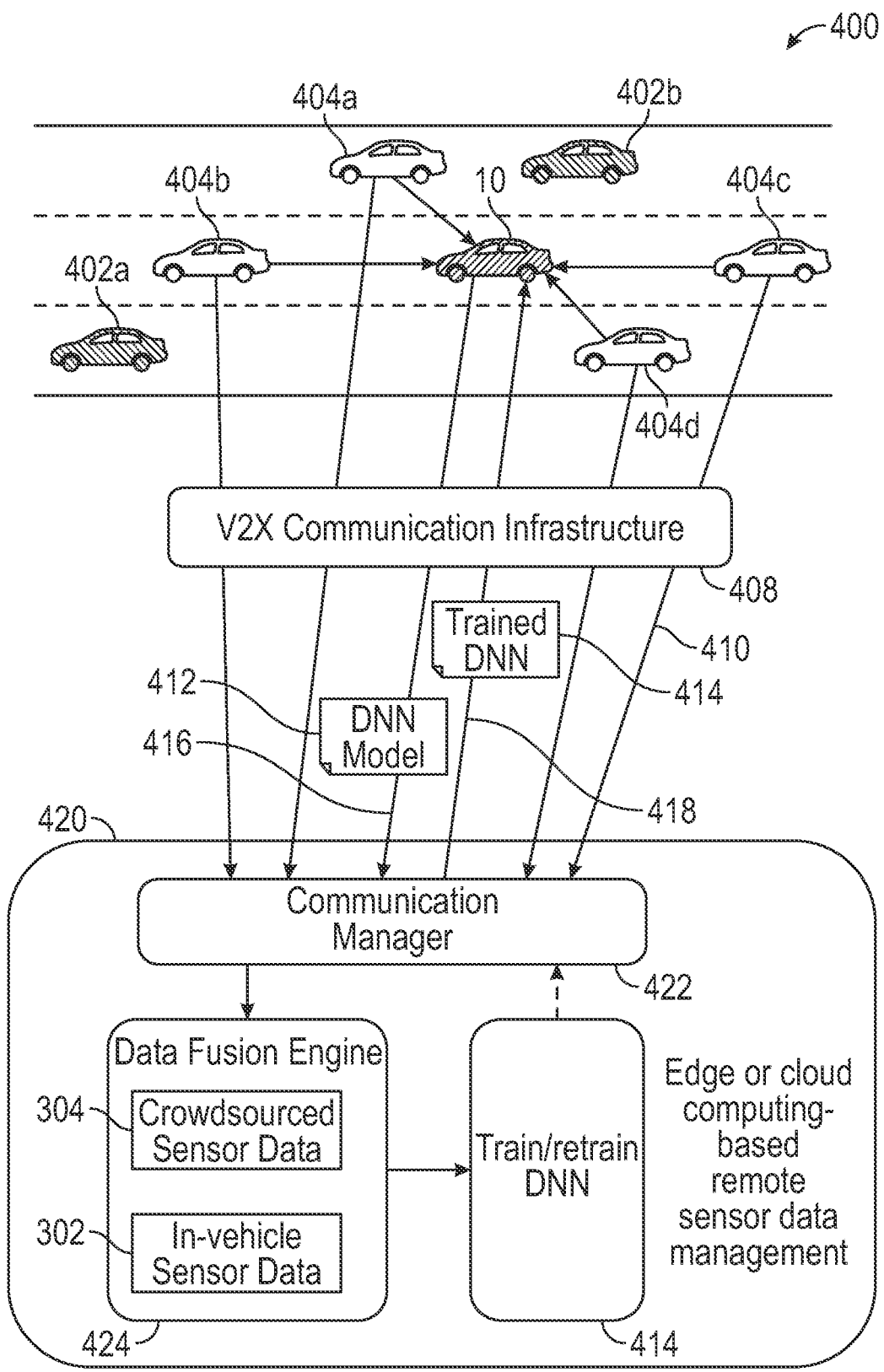
FIG. 4 shows an illustrative schematic diagram of a crowdsourcing system between the vehicle and other agents surrounding the vehicle for detecting failures in an in-vehicle state estimator of the vehicle.

FIG. 4 shows an illustrative schematic diagram of a crowdsourcing system 400 between the vehicle 10 and other agents surrounding the vehicle for detecting failures in in-vehicle state estimator 204 of the vehicle 10. The vehicle 10 is shown as part of a traffic pattern that includes both non-participating agents 402a and 402b and participating agents 404a-404d. Non-participating agents 402a and 402b are vehicles that either do not obtain data regarding the host vehicle 10 or do not share the data for the purposes of crowdsourcing. Participating agents 404a-404d obtain data regarding the host vehicle 10 and participate in the crowdsourcing system 400 by sharing such obtained data to the crowdsourcing system 400. The participating agents 404a-404d can include radar system, Lidar systems, global positioning systems, optical cameras, thermal cameras, ultrasonic sensors, and/or other sensors for observing and measuring parameters of the host vehicle 10. The participating agents 404a-404d can communicate with the host vehicle 10 via vehicle-to-vehicle ("V2V") communication as shown by illustrative V2V link 408 or through the infrastructure using vehicle-to-infrastructure ("V2I") communication as shown by illustrative V2I communication link 410, as well as any other suitable communication system.

The participating agents 404a-404d send data via the V2I communication link 410 to a remote data manager 420, such as a cloud processor or cloud computer at an offsite location away from the vehicle. The remote data manager 420 can include a communication manager 422 for controlling the flow of data or information to and from the remote data manager 420. The host vehicle 10 can communicate a Deep Neural Network (DNN) model 412 to the remote data manager 420 over a V2I uplink channel 416 and receives from the remote data manager 420 a trained DNN 414 over V2I downlink channel 418. The DNN model 412 sent to the remote data manager 420 can be an untrained DNN, in various embodiments.

The remote data manager 420 includes a data fusion engine 424 which receives the DNN model 412 as well as in-vehicle sensor data 302 from the host vehicle 10 and crowdsourced data 304 from the participating agents 404a-404d. The data fusion engine 424 uses the in-vehicle sensor data 302 and the crowdsourced data 304 to train and retrain the DNN model 414. The trained DNN 414 is then communicated to the host vehicle 10 over the VI downlink channel 418. The host vehicle 10 can then use the trained DNN 414 to compare DNN results with in-vehicle sensor parameter measurements to determine a quality of the in-vehicle sensor parameter measurements.

Figure 5:
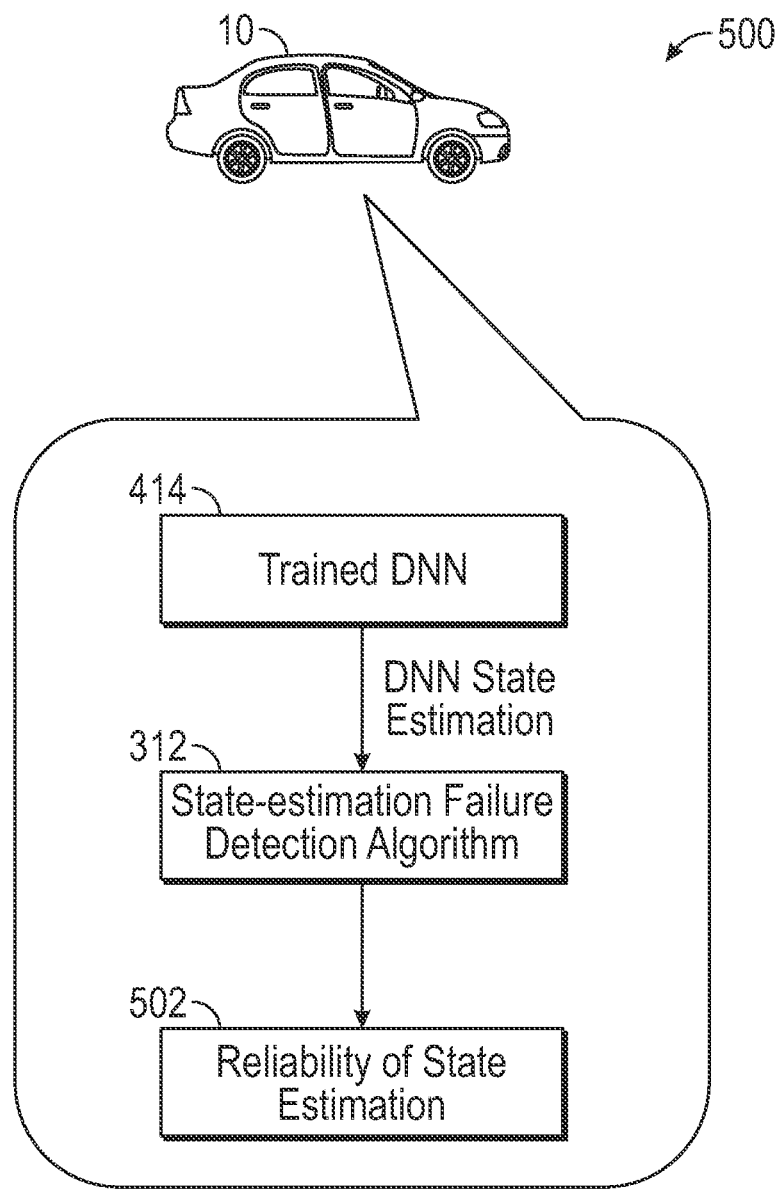
FIG. 5 shows a schematic diagram of an operation of a trained Deep Neural Network (DNN) at the vehicle to determine the quality of the in-vehicle sensor measurements.

FIG. 5 shows a schematic diagram 500 of an operation of the trained DNN at the host vehicle 10 to determine the quality of the in-vehicle sensor measurements. The trained DNN 414 is used to generate a state of the vehicle 10, such as a longitudinal velocity and lateral velocity. These determined velocities are then compared at comparison engine 312 to longitudinal velocity and lateral velocity values determined from the in-vehicle sensor measurements to determine a validity or quality 502 of the in-vehicle state estimator. In various embodiments, the comparison engine 312 can generate a value indicative of the quality of the in-vehicle sensors measurement upon their comparison the data from the trained DNN. The value can be compared to a selected threshold value in order to determine a fault at the state estimator 204.

Figure 6:
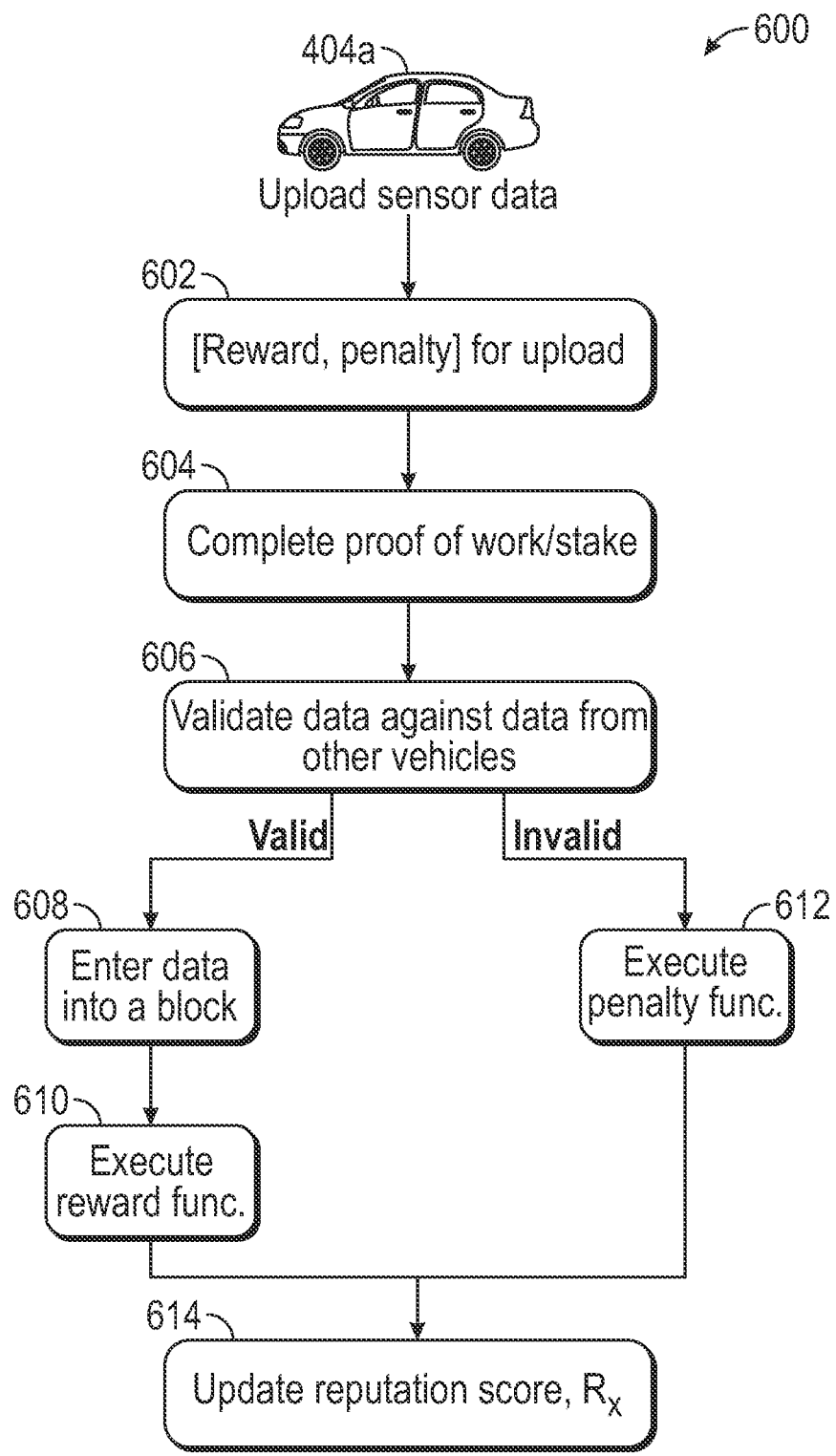
FIG. 6 shows a flowchart illustrating a method for maintaining an integrity of crowdsourced data.

FIG. 6 shows a flowchart 600 illustrating a method for maintaining an integrity of crowdsourced data 304. The method begins with the participating agent (e.g., participating agent 404a) uploading its sensor data to the remote data manager 420. The sensor data can include, for example, the measured lateral velocity and/or longitudinal velocity of the host vehicle. Metadata for the participating agent is uploaded to the remote data manager 420 along with the sensor data. The metadata includes a reputation score of the participating agent 404a. In box 602, the remote data manager 420 obtains a reputation score for the participating agent.

In box 604, the remote data manager 420 reviews the uploaded data from the participating agent 404a in order to ensure the integrity of the uploaded data. The review includes a proof-of-work test to eliminate noisy data or unsolicited data. In box 606, the remote data manager 420 determines a validity of the uploaded data from the participating agent by comparing the uploaded data to data from other participating agents. If the uploaded data is considered valid based on the comparison the method proceeds to box 608. In box 608, the uploaded data is entered to a blockchain data store for used in training the DNN. Then in box 610, a reward function for the participating agent 404a is performed to determine a reward for the uploaded data. Subsequently, in box 614 the reputation score is updated to include the determined reward.

Returning to box 606, if the uploaded data is considered invalid based on the comparison performed in box 606, the method proceeds to box 612. In box 612, a penalty function is performed to determine a penalty for the uploaded data. Subsequently, in box 614, the reputation score is updated to include the determined penalty. The reputation score can be transmitted back to the participating agent 404a or can be stored at the data manager 420 in various embodiments. The confirmed data can be selected for used to train the DNN using either of the processes discussed below with respect to FIG. 7 and FIG. 8.

Figure 7:
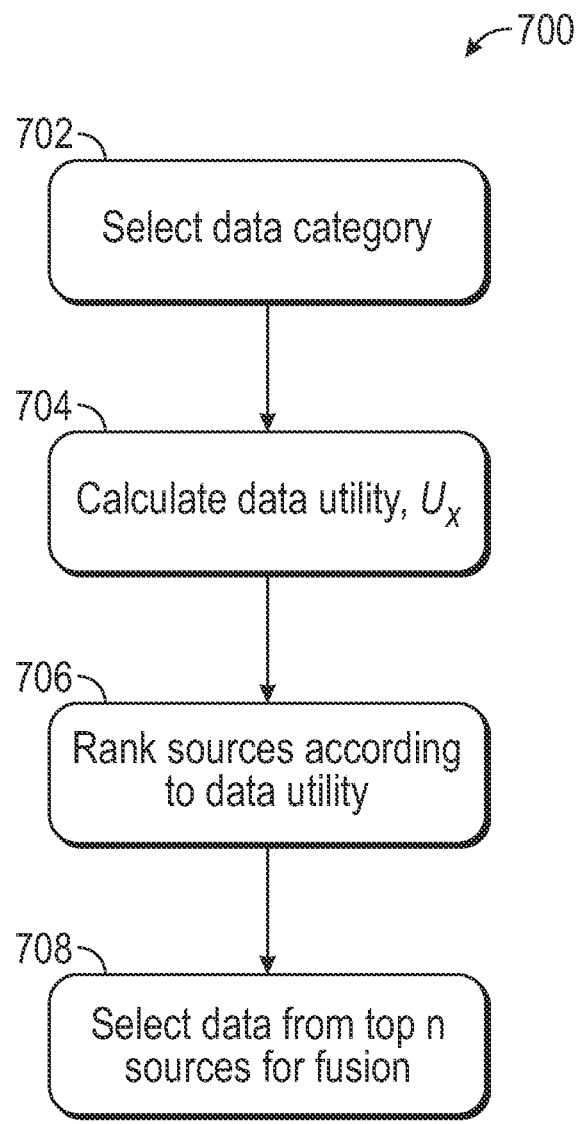
FIG. 7 shows a flowchart illustrating a utility-based method for selecting data for use in training the trained DNN.

FIG. 7 shows a flowchart 700 illustrating a utility-based method for selecting data for use in training the DNN 414. The selection process includes ranking and filtering the data. In box 702, the host vehicle selects a data category of interest, such as data pertaining to longitudinal velocity, for example. In box 704, the remote data manager 420 calculates a utility value of data from each participating agent 404a with respect to the data category. In box 706, each dataset is ranked based on their utility value. In box 708, the datasets having the $n^{th}$ highest utility values are selected to train the DNN, where n is a selected number.

The utility value of data for a participating agent 404a is based on various parameters, such as the reputation score $R_x$ of the participating agent and the sensor capabilities $SC_x$ of the participating agent, both of which are provided as part of the metadata of the participating agent. The sensor capability score is a function of various parameters, such as radar range, lidar resolution, camera resolution, number of radar system, number of cameras, etc. The utility value is further based on a location $Loc_x$ at which the data is collected or measured and a timestamp $T_x$ of the data, both of which are provided as part of metadata of the sensor data. The utility value $U_x$ can be calculated (in box 604) from these parameters using Eq. (1):

$$U_x = (w_1 * R_x) + (w_2 * SC_x) + (w_3 * Loc_x) + (w_4 * T_x) \qquad \text{Eq. (1)}$$

where w1, w2, w3 and w4 are weights for each parameter.

Figure 8:
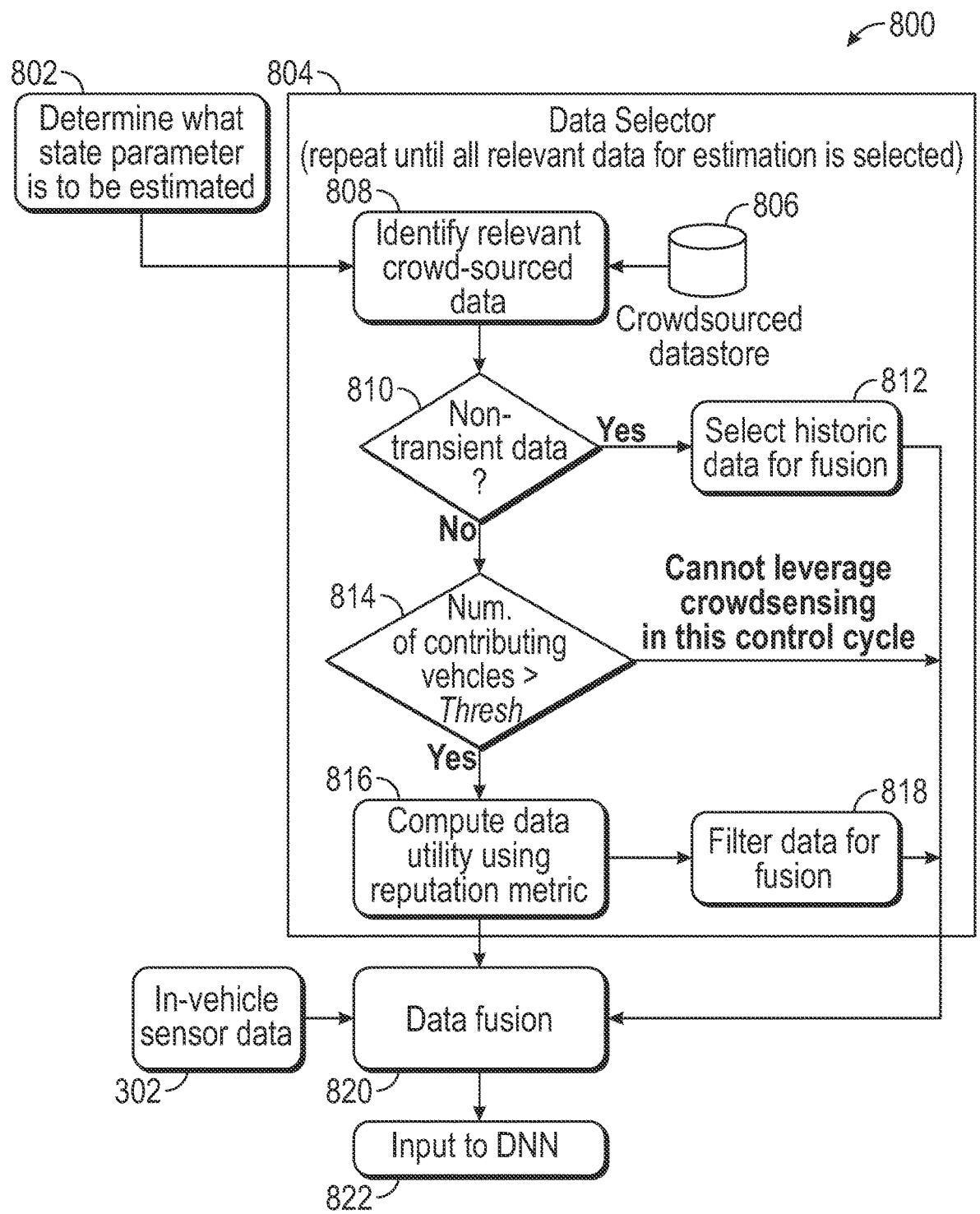
FIG. 8 shows a flowchart illustrating a metric-based method for selectin data for training a DNN.

FIG. 8 shows a flowchart 800 illustrating a metric-based method for selecting data for training a DNN. In box 802, the remote data manager 420 is provided with a state parameter that is to be estimated by a trained DNN. The selected parameter is provided to a data selector 804. The data selector 804 includes a database 806 of crowdsourced data. In box 808, the crowdsourced data that is relevant to the selected state parameter is retrieved from the database 806.

In box 810, the remote data manager 420 determines whether the relevant crowdsourced data is transient data or non-transient data. Non-transient data include data such as road angle, road curvature, etc. If the data is non-transient, then the method proceeds to box 812. In box 812, historic data is selected for data fusion, and the method proceeds to box 820. In box 820, data fusion occurs Returning to box 810, if the data is transient data, (i.e., vehicle speed, etc.), the method proceeds to box 814. In box 814, the remote data manager 420 determines whether the number of participating agents is above a selected threshold. If the number of participating agents is below the selected threshold, then there is not enough data available to be useful in the training of the DNN. The method then selects no further data and proceeds to box 820, wherein data fusion proceeds. Returning to box 814, if the number of participating agents is greater than the selected threshold, then the method proceeds to box 816.

In box 816, the remote data manager 420 computes the data utility, for example, using the reputation methods disclosed herein. In box 818, the remote data manager 420 filters the data based on their reputation metric for used in training the DNN. In box 820, the selected crowdsourced data is fused with relevant in-vehicle sensor data 302 and in box 822 the fused data is input to the DNN.

Figure 9:
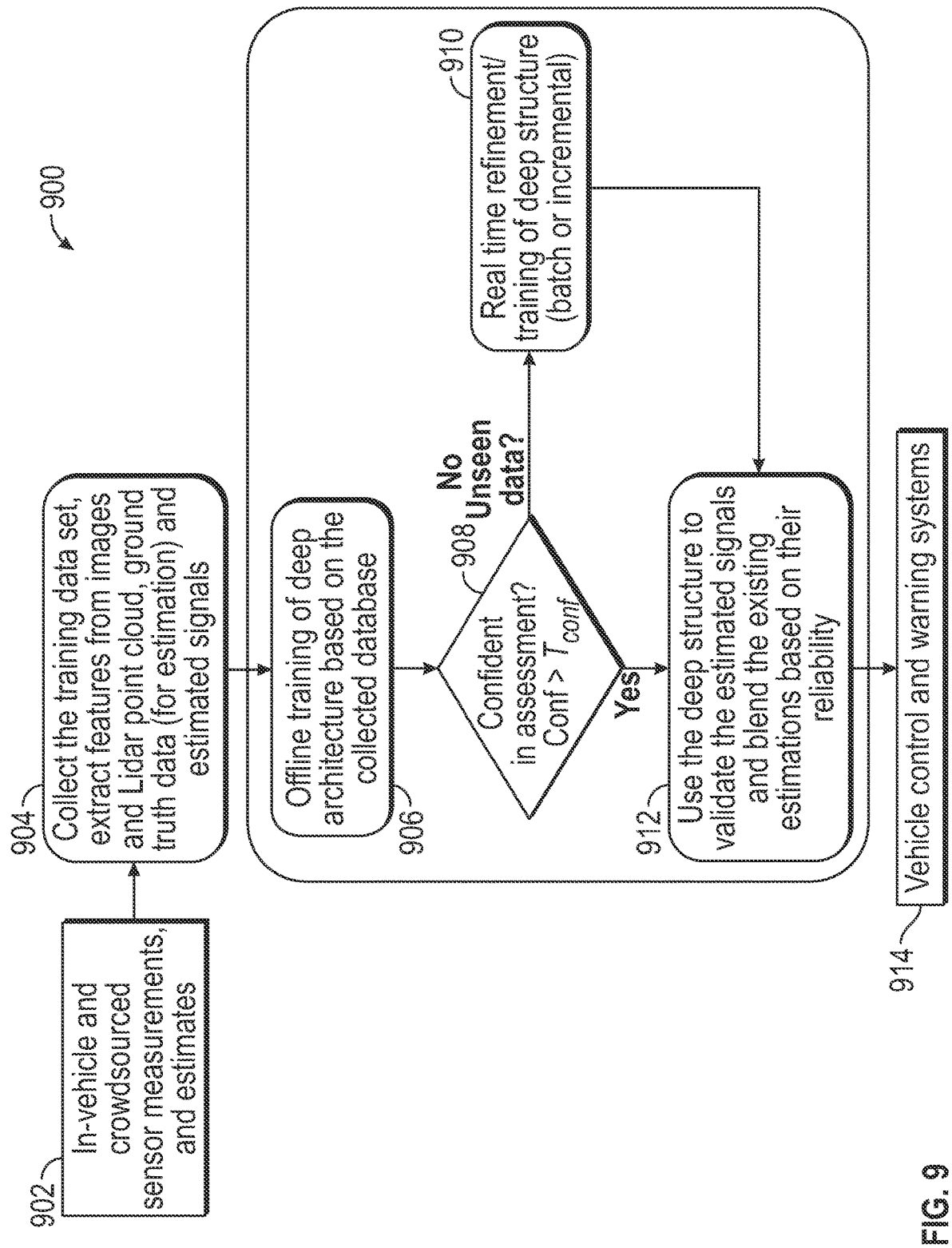
FIG. 9 shows a flowchart illustrating the DNN-based method of validating the in-vehicle sensor measurements.

FIG. 9 shows a flowchart 900 illustrating the DNN-based method of validating the in-vehicle sensor measurements. In box 902, the in-vehicle and crowdsourced sensor measurements are fused to form a training set. In box 904, the training data set is collected, and features are extracted for estimation of the state parameters. The extracted features can include but are not limited to images, Lidar point clouds, ground truth data, etc. In box 906, the remote data manager 420 trains the DNN using the training data set. In box 908, the remote data manager 420 computes a confidence value for the trained DNN. When the confidence value is greater than a selected confidence value threshold, the method proceeds to box 912. In box 912, the DNN is used to validate estimated signals and blend the existing estimations from participants based on their reliability score or reputation score. From box 912, the method proceeds to box 914 in which vehicle control system and warning signals are activated.

Returning to box 908, when the confidence value is less than a selected confidence value threshold, the method proceeds to box 910. In box 910, the DNN is trained or retrained in real time using real time data. From box 910, the method proceeds to box 912. In box 912, the DNN is used to validate estimated signals and blend the existing estimations from participants based on their reliability score or reputation score. From box 912, the method proceeds to box 914 in which vehicle control system and warning signals are activated.

Figure 10:
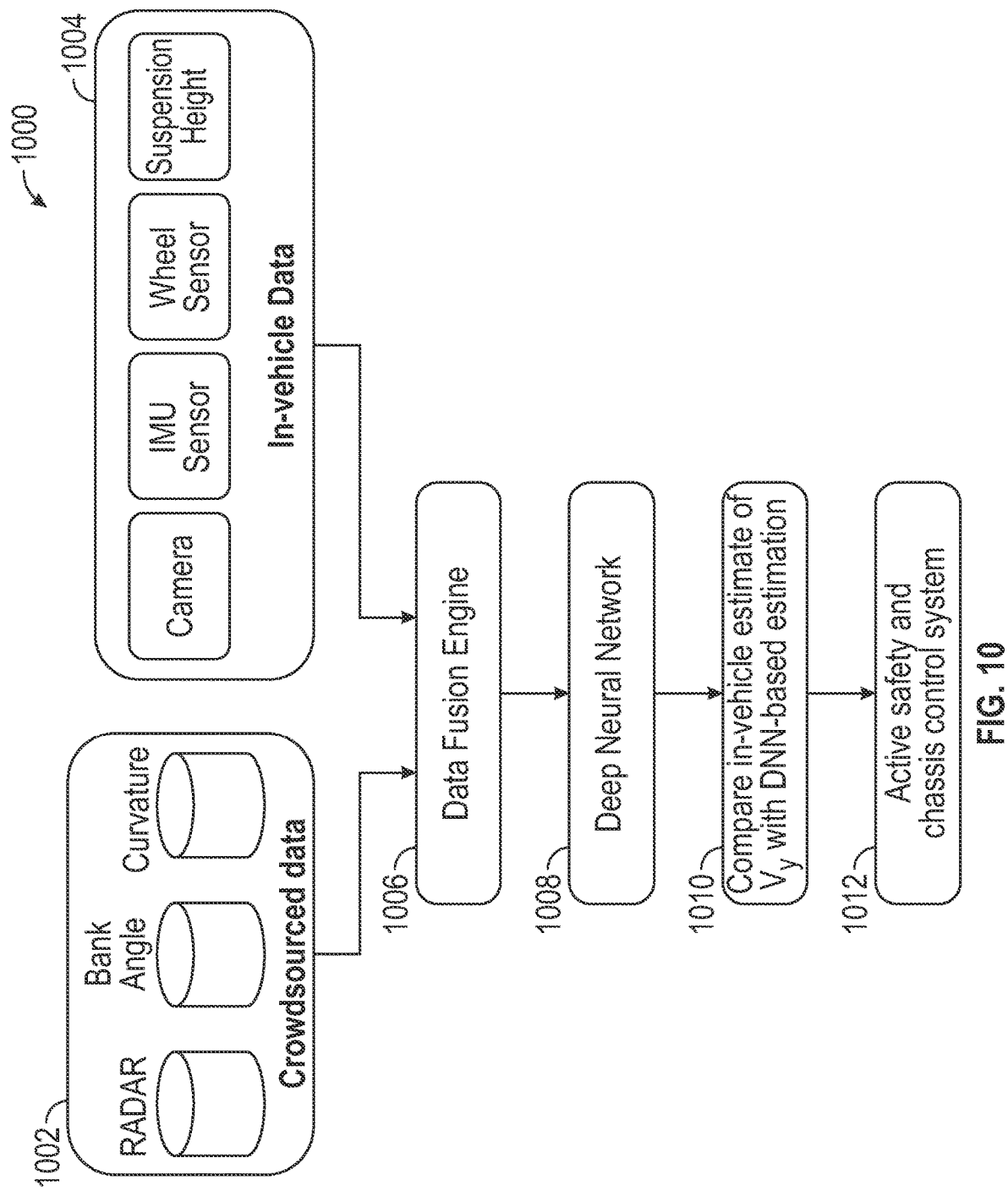
FIG. 10 shows a schematic diagram illustrating a state estimation verification process.

FIG. 10 shows a schematic diagram 1000 illustrating a state estimation verification process. In box 1002, crowdsourced data is collected, including radar data, data regarding road bank angle, road curvature, etc. In box 1004, in-vehicle data is collected, including camera data, IMU sensor data, wheel sensor data, suspension height data, etc. In box 1006, the crowdsourced data and the in-vehicle data is supplied to a data fusion engine. In box 1008, the fused data is provided to a Deep Neural Network, which generates a state estimation value. For illustrative purposes, the DNN generates a lateral velocity estimate. In box 1010, the lateral velocity estimate generated by the DNN is compared to an in-vehicle estimate of lateral velocity to determine the ability of the state estimator to provide a valid estimation of the lateral velocity. In box 1012, a safety system and/or chassis control system of the vehicle or navigation system is operated based on the validity of the in-vehicle estimation.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:
1. A method for operating a host vehicle, comprising:
measuring an in-vehicle parameter of the host vehicle using in-vehicle sensors of the host vehicle;
determining a detected value of a state parameter of the host vehicle using the in-vehicle parameter;

receiving, at a remote agent, crowdsourced data including a plurality of measurements associated with the state parameter from a plurality of participating agents;

performing, at the remote agent, a verification of the crowdsourced data and assigning a reputation score to each participating agent providing the crowdsourced data, wherein the crowdsourced data is filtered, ranked and selected based on reliability and quality of the crowdsourced data;

determining, at the remote agent, a check value of the state parameter based on the plurality of measurements associated with the state parameter of the host vehicle obtained by the plurality of participating agents, when a number of participating agents is above a selected threshold;

receiving the check value of the state parameter at the host vehicle via a communication unit of the host vehicle;

comparing the detected value of the state parameter the check value of the state parameter to determine a quality of the in-vehicle parameter; and operating the host vehicle based on the comparison.

2. The method of claim 1, further comprising training a neural network using the sensor data and the crowdsourced data and determining the check value using the trained neural network.

3. The method of claim 2, further comprising training the neural network at an offsite location using the sensor data and the crowdsourced data and transmitting the trained neutral network from the offsite location to the host vehicle.

4. The method of claim 2, further comprising determining the check value using the trained neural network at the host vehicle.

5. The method of claim 1, further comprising selecting a training set of data based on a utility of the training set of data to a selected data category.

6. The method of claim 1, further comprising selecting a training set of data based on a metric for the crowdsourced data.

7. The method of claim 1, wherein the state parameter is a lateral velocity of the host vehicle.

8. A system for operating a host vehicle, comprising:
a remote data manager for:
  receiving crowdsourced data including a plurality of measurements associating with a state parameter of the host vehicle from a plurality of participating agents;
  performing a verification of the crowdsourced data and assigning a reputation score to each participating agent providing the crowdsourced data, wherein the crowdsourced data is filtered, ranked and selected based on reliability and quality of the crowdsourced data;
  determining a check value of the state parameter based on a the plurality of measurements associated with the state parameter of the host vehicle obtained from the plurality of participating agents, when a number of participating agents is above a selected threshold;
a communication unit of the host vehicle for receiving the check value of the state parameter from the remote data manager;
an in-vehicle sensor for measuring an in-vehicle parameter of the host vehicle;
a processor of the host vehicle configured to:
  determine a detected value of a state parameter of the host vehicle from the in-vehicle parameter;
  compare the detected value of the state parameter to the check value of the state parameter to determine a quality of the in-vehicle parameter; and
  operate the host vehicle based on the comparison.

9. The system of claim 8, wherein the processor is further configured to train a neural network using the sensor data and the crowdsourced data and determine the check value using the trained neural network.

10. The system of claim 9, wherein the processor is at an offsite location from the host vehicle and is further configured to train the neural network using the sensor data and the crowdsourced data and transmit the trained neutral network from the offsite location to the host vehicle.

11. The system of claim 9, wherein the processor is further configured to determine the check value using the trained neural network at the host vehicle.

12. The system of claim 8, wherein the processor is further configured to select a training set of data based on a utility of the training set of data to a selected data category.

13. The system of claim 8, wherein the processor is further configured to select a training set of data based on a metric for the crowdsourced data.

14. A host vehicle, comprising:
an in-vehicle sensor for measuring an in-vehicle parameter of the host vehicle;
a communication unit for receiving a check value of a state parameter of the host vehicle from a remote data manager,
  the remote data manager receiving crowdsourced data including a plurality of measurements associating with the state parameter of the host vehicle from a plurality of participating agents, performing a verification of the crowdsourced data and assigning a reputation score to each participating agent providing the crowdsourced data, wherein the crowdsourced data is filtered, ranked and selected based on reliability and quality of the crowdsourced data, and determining the check value based on the plurality of measurements associated with the state parameter of the host vehicle obtained from the plurality of participating agents, when a number of participating agents is above a selected threshold;
a processor of the host vehicle configured to:
  determine a detected value of the state parameter of the host vehicle from the-in-vehicle parameter;
  compare the detected value of the state parameter to the check value of the state parameter to determine a quality of the in-vehicle parameter; and
  operate the host vehicle based on the comparison.

15. The host vehicle of claim 14, wherein the processor is further configured to receive a trained neural network that is trained using the sensor data and the crowdsourced data and using the trained neural network to determine the check value.

16. The host vehicle of claim 15, wherein the neural network is trained at an offsite location and the host vehicle receives the trained neutral network from the offsite location.

17. The host vehicle of claim 15, wherein the processor is further configured to determine the check value using the trained neural network at the host vehicle.

18. The host vehicle of claim 14, wherein the processor is further configured to select a training set of data based on one of: (i) a utility of the training set of data to a selected data category; and (ii) a metric for the crowdsourced data.

* * * * *